United States Patent [19]

Baker

[11] Patent Number: 4,895,550
[45] Date of Patent: * Jan. 23, 1990

[54] BLOW-MOLDED CONVOLUTED BOOT

[75] Inventor: W. Howard Baker, Hartsville, Tenn.

[73] Assignee: Wynn's-Precision, Inc., Lebanon, Tenn.

[*] Notice: The portion of the term of this patent subsequent to Nov. 22, 2005 has been disclaimed.

[21] Appl. No.: 224,630

[22] Filed: Jul. 27, 1988

Related U.S. Application Data

[63] Continuation-in-part of Ser. No. 48,182, May 11, 1987, abandoned.

[51] Int. Cl.⁴ .............................................. F16D 3/84
[52] U.S. Cl. ............................ 464/175; 277/212 FB
[58] Field of Search ................... 277/212 FB; 403/50; 464/173, 175

[56]  References Cited

U.S. PATENT DOCUMENTS

| | | | |
|---|---|---|---|
| 3,292,957 | 12/1966 | Ulderup | 74/18.1 X |
| 3,404,573 | 10/1968 | Cull et al. | 403/50 |
| 3,468,171 | 12/1969 | Macielinski | 464/173 X |
| 3,511,061 | 5/1970 | Burckhardt | 464/175 |
| 3,520,152 | 7/1970 | Schmid | 464/175 X |
| 3,798,927 | 3/1974 | Girguis | 464/175 X |
| 4,145,896 | 3/1979 | Pringle | 464/175 X |
| 4,202,184 | 5/1980 | Krude et al. | 464/175 X |
| 4,278,262 | 7/1981 | Mizutani et al. | 277/212 FB |
| 4,456,269 | 6/1984 | Krude et al. | 464/175 X |
| 4,556,399 | 12/1985 | Billet et al. | 464/175 |
| 4,560,178 | 12/1985 | Hempel | 464/175 X |
| 4,693,484 | 12/1987 | Ukai et al. | 277/212 FB |
| 4,730,834 | 3/1988 | Ukai et al. | 277/212 FB |
| 4,735,596 | 4/1988 | Ukai et al. | 464/175 |
| 4,786,272 | 11/1988 | Baker | 464/175 |

FOREIGN PATENT DOCUMENTS 1096987 12/1967 United Kingdom .

Primary Examiner—Daniel P. Stodola
Attorney, Agent, or Firm—Biebel, French & Nauman

[57]  ABSTRACT

A blow-molded convoluted boot, made of TPE material, for use on CV joints and the like in which one end may be required to be operated at high angular offsets from the other end, includes a plurality of conventional bellows-like convolutions, and an integral, non-convoluted rolling diaphragm portion which has a reverse folded-over configuration which permits the angular deflection of the respective ends without introducing undue tension in the boot material.

1 Claim, 1 Drawing Sheet

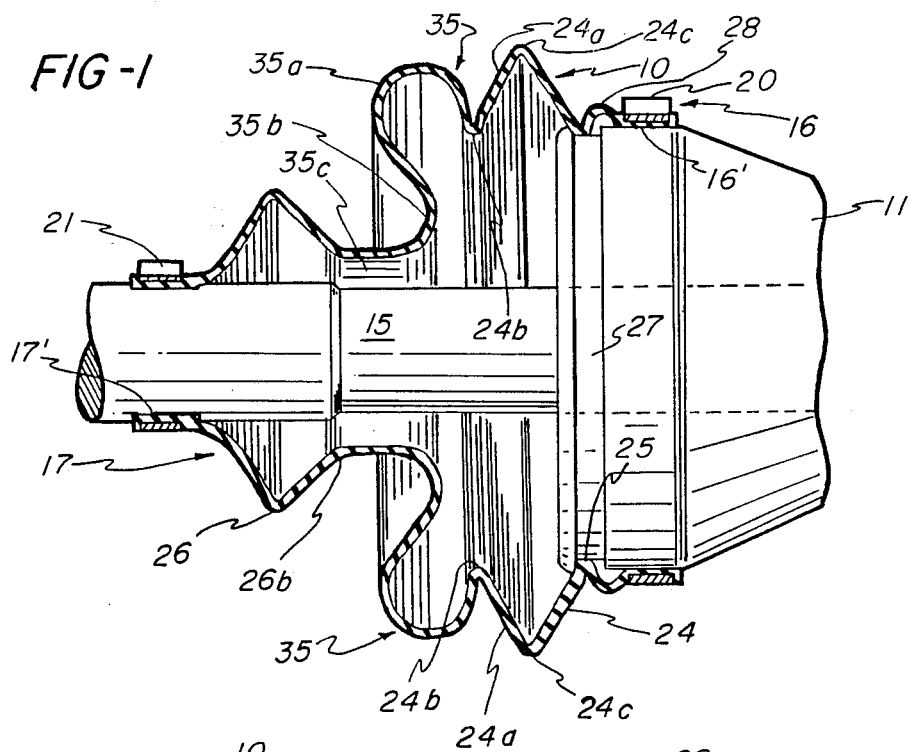
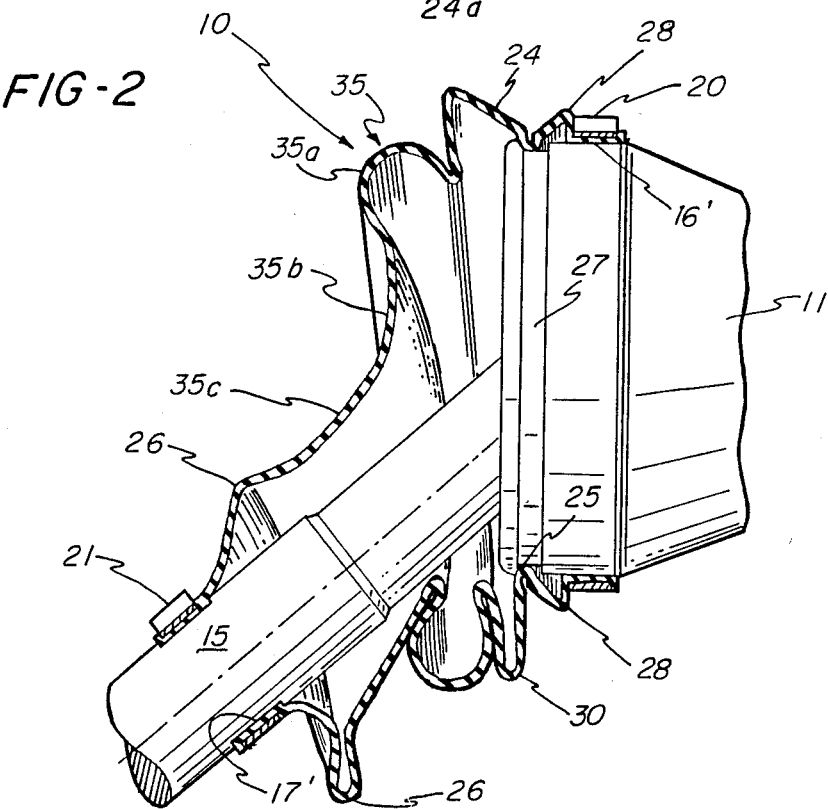

BLOW-MOLDED CONVOLUTED BOOT

RELATED APPLICATION

This application is a continuation-in-part of Ser. No. 048,182 filed May 11, 1987, now abandoned.

BACKGROUND OF THE INVENTION

This invention relates to blow-molded articles, and more particularly to convoluted boots and the like formed from relatively hard polymer materials, as compared to the softer rubbers, for use with constant velocity joints.

Constant velocity or CV joints, as used on automotive drive axles, such as on front wheel drive cars, are commonly enclosed within a convoluted elastomer boot. Such convoluted boot, that is, boots having a plurality of axially spaced annular convolutions, are commonly formed with a small end which is retained by a clamp on the drive shaft leading out of the joint, and a large end clamped to an annular surface of the body of the CV joint. Such boots provide a seal for the joint over the operating range of the constant velocity joint, which may include drive offset angles from between 0° up to 40° or more between the shaft and the joint body. Such boots are commonly molded or rubber, which may have a hardness in the range of Shore 65A, for example, which permits the boot to flex with the flexing of the joint.

More recently, blow molded boots formed of more rigid thermoplastic polyester elastomers have come into use as a substitute for the rubber boot, by reason of the greater mechanical and physical strength of such elastomers over a wide variety of operating conditions, and generally by reason of the greater toughness of such elastomers and their ability to resist puncture or tearing. However, such blow molded polymers are considerably harder and stiffer than their rubber counterparts, and may, for example, have a hardness in the range of Shore 50D and a flexural modulus of 18,009 psi or more (at 22° C.).

Typical materials from which blow-molded convoluted boots have been made are commonly referred to as thermoplastic elastomers (TPE) and include polyester, polyether, polybutylterephthalate compounds (PEEBT). Typical thermoplastic elastomer materials which are used for blow-molding convoluted boots, as defined above, include du Pont "Hytrel", HTG-5612 and Monsanto's "Santoprene" thermoplastic rubber, typically grade 103-40. Such elastomers, as compared to typical rubbers, have a substantially greater tendency to deform at relatively low elongation forces, and typically have a maximum or 100% modulus which is less than half of the ultimate tensile stress.

Such blow-molding elastomers have limited ability to accept tensile loading without undergoing deformation. Accordingly, it has been found necessary in simple convoluted boots, to mold the same at their maximum extension or length as expected in use, so that the boots will experience only compression, and also will not be subject to buckling when axially extended to the maximum.

The requirements for maintaining the material under relatively low tension, or no tension at all, are particularly difficult to obtain when the boot is designed to operate in conjunction with a constant velocity joint, where the joint may, from time to time, be operated at relatively high angular offsets. Such high angular offsets can introduce an undesired tension into the boot material resulting in premature failure. In addition, the problem of anchoring such boots at the sleeve-like ends is complicated by the relative hardness of the material and the stresses applied to the clamping areas.

SUMMARY OF THE INVENTION

This invention is directed to a blow-molded convoluted bellows-type of boot which incorporates an integral rolling diaphragm portion between the ends. Preferably, the rolling diaphragm portion, in the relaxed state, forms a reverse fold or curvature. The integral rolling diaphragm portion, joined with the conventional convoluted portion, permits high angular offsets while providing the necessary boot material to prevent the introduction of undue tensile loads in the boot. The customary practice of placing the boot in compression at assembly, which provided a great amount of interference between convolutions at high angular offsets, is alleviated by the integral rolling diaphragm portion of the boot.

The boot design has the secondary advantage of allowing the boot to be installed in a free state, and eliminating interference between convolutions at high angles. Further benefits include the incorporation of a wear area in the rolling diaphragm portion that could be made thick enough to prevent wear through. Further, the total inner volume is reduced as compared to current constant velocity joint seals, thereby reducing the amount of grease required.

While the rolling diaphragm portion may be included at various locations between the boot ends, it is preferred to locate the same at a generally centralized axial region, between convolutions. The large end of the boot may be retained by an annular retention convolution portion in a recess or groove on the joint body in accordance with the teachings of copending application Ser. No. 007,709 filed Jan. 28, 1987, now abandoned, and continuation-in-part application Ser. No. 090,186 filed Aug. 27, 1987, the teachings of which are incorporated herein by reference. The retainer convolution portion in the boot wall is joined to the clamping extension through an integral hinge which isolates the extension sleeve from dislodging forces supplied by the boot at high offset angles.

It is accordingly an important object of this invention to provide a blow-molded boot, particularly adapted as a constant velocity joint seal, or the like, integrally incorporating a rolling diaphragm portion.

A still further object of the invention is the provision of a blow molded convoluted boot formed of TPE material having an integral rolling diaphragm portion located within the convolute portion and between convolutions, which diaphragm portion has a reverse curvature in the relaxed or free state.

These and other objects and advantages of the invention will be apparent from the following description, the accompanying drawings and the appended claims.

BRIEF DESCRIPTION OF THE DRAWINGS

FIG. 1 is a transverse section through the boot as mounted on a constant velocity joint showing the input shaft in alignment with the joint; and FIG. 2 is a view similar to FIG. 1 showing the position of the boot with the input shaft offset from the joint.

DETAILED DESCRIPTION OF PREFERRED EMBODIMENT

Referring to the figures of the drawing, which illustrate a preferred embodiment of the invention, a blow-molded convoluted type boot is illustrated generally at 10 in FIGS. 1 and 2. The boot is shown as having its large end 16 mounted on the body 11 of a typical constant velocity (CV) joint, and as having its small end 17 mounted on the drive shaft 15 leading from the joint. Encircling low-profile clamps 20 and 21 respectively encircle the boot at its larger end and at its smaller end. The larger end of the boot is provided with an axial extension portion 16' fitted under the clamp 20, while the smaller end is defined by an axially-extending portion 17' fitted under the encircling clamp 21.

The boot 10 is formed with a plurality of individual convolutions which include at least one convolution 24 formed adjacent the larger end of the boot and at least one smaller convolution 26 formed adjacent the smaller end of the boot. Each of the convolutions is formed with relatively straight side walls (when viewed in section), such as the wall 24a of the convolutions 24, which leads from an inner end or valley 24b to an outer end or peak 24c. The convolution 24, at the larger end 16 of the boot, further includes an inwardly-extending retention convolution portion 25. The inwardly extending portion 25, forming one of the valleys of the convolution 24, is received within an outwardly opening, U-shaped channel or groove 27 formed in the body 11 of the constant velocity joint. The radius of the inwardly extending portion 25 is smaller than the axial width of the groove 27 so that the radius end may float or move within the axial dimensions of the groove 27.

The portions 25 defines a clamping convolution which, in the relaxed state shown in FIG. 1, is naturally received within the confines of the channel or groove 27 and forms a strain relief, and effectively isolates the axially extending portion 16' from the remainder of the body of the boot. For this purpose, the end 16' is joined to the portion 25 through an integral annular hinge 28. The hinge 28 permits the movement of the convolution valley or radius portion 25 within the groove, without placing an undue stress on the end 16 and the encircling clamp 20. The small end convolution 26 leads directly, at its small end, into the axially extending portion 17' under the clamp 21.

A rolling diaphragm or bellows section 35 is located between the convolutions and in the preferred embodiment, is located between the large convolution 24 and the small convolution 26. The section 35 is formed as an integral part of the wall of the boot and in the relaxed state shown includes a first smoothly outwardly curved section 35a. The section 35a is joined to the convolution 24 at the inner end or valley 24b and curves radially outwardly therefrom toward the smaller end. The section 35a joins with an intermediate section 35b. The intermediate section 35b defines a reverse or inwardly extending section, in the relaxed condition of the boot, and extends both inwardly and axially toward the larger end 16 and then, at its inner end, turns or is curved radially and extends in an axial direction toward the smaller end. The intermediate section 35b is joined with a third and generally axially extending section 35c. The section 35c is spaced, in the related state, from the shaft 15, and smoothly joins the adjacent inner end 26b of the smaller convolution 26.

The three sections 35a, 35b and 35c formed a rolling diaphragm boot portion between the first and the last convolution of the boot. The rolling diaphragm portion is characterized by a reverse curvature, in the section 35b, in the relaxed position of the boot.

As noted above, under the "Background" section of this application, the typical TPE polymers employed in the blow-molding of convoluted boots have relatively high tensile set and exhibit unacceptable elongations under tension. When such a boot is operated as a shaft enclosure for substantially aligned fixed or rotating components, a conventional series of axially-connected annular convolutions may be used. However, when the boot is required to be used in combinations in which the axis of one end of the boot is quite substantially offset from the axis of the other end of the boot, such as where the small end 17 is offset from 30°–40° or more from the axis of the large end 16, as illustrated in FIG. 2, an undue amount of tension or stress may be applied to the polymer material.

As previously noted, the retention portion 25 is received within the groove 27 and is free to move within the confines of the groove. Such movement is accompanied by deflection about the integral annular hinge 28. The hinge 28 isolates the clamping extension 16' of the boot from axial forces which would otherwise tend to be transmitted through the boot when the constant velocity joint 11 is operated at positions of high angular offset, as illustrated for example in FIG. 2.

The retention portion 25 of the first convolution is also effective in transmitting axial loads or stresses from the wall of the boot 10 to the body 11 of the constant velocity joint during the conditions as illustrated in FIG. 2. Forces which may tend to withdraw the radius or nose portion of the convolution portion 25 from the groove 27 have the effect of increasing the force by which the portion 25 is seated within the groove. The rolling diaphragm portion coprising the sections 35a, 35b and 35c cooperate to prevent undue tensile forces from being applied to the material making up the wall of the boot at high angular offsets, as shown in FIG. 2.

The axial section 35c has the secondary advantage of providing a wear area, and can be made thick enough so as to prevent wear-through problems due to its close proximity to the outer surface of the shaft 15, particularly in highly angulated positions. Further, the entire rolling diaphragm portion reduces the inside volume of the seal, and accordingly reduces the amount of total grease required for a typical joint. The design is one in which a minimum of tension or elongation is imparted to the polymer material, providing a life which is not shortened by the relative inability of such TPE material to be operated in any substantial tension. Thus, the advantages and benefits of such a blow-molded boot, over a conventional rubber boot, may be enjoyed in instances where the respective opposite ends are required to be operated over large offset angles, as shown in FIG. 2, which would otherwise shorten the life of a conventional blow-molded boot.

In the manufacture of the boot 10 of this invention, it is contemplated that a suitable blow-mold parison will be formed. A parison may be formed by injection molding into a cavity over a core, in which the cavity and core have their dimensions established in accordance with a desired blow ratio. The parison, with the core thereon, may then be carried to a blow-up position, and placed in a blow mold incorporating the standard mold halves and further having cammed or slide components which, when closed, move in and defined and form the bellows or inwardly and rearwardly directed surfaces of the portions 35a, 35b, and 35c. After molding, the insert or cammed portions are retracted or removed from the mold, and the finished blow-molded article may be stripped conventionally from the core in a stripping position.

The operation of this invention is largely self-evident from the foregoing description and the drawings. The reverse folded portion 35b, accompanied by the smooth curve on the outer portion 35a and the smooth junction between the reverse diaphragm portion 35b and the axial portion 35c, permit the same to be substantially straightened on the one hand, and permits the folding together of excess material on the other hand, in the extreme angulated position as shown in FIG. 2. While the adjacent side walls of the convolution defining the outer curved portion 35a and the adjacent first convolution 30 may come into physical contact, this contact is held to an angular minimum so as not to induce undue wear. The straightened out portions are accompanied by the unfolding and forward movement of the intermediate normally folded-back or reverse curved portion 35b, as shown in the upper half of the seal, in FIG. 2. The material in the diaphragm portion 35 is sufficient to prevent the application of undue tension in the material, in such extreme offset conditions.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A blow-molded annular convoluted boot formed of thermoplastic elastomer material and having a large end terminating in a large diameter axial clamping extension adapted to be secured to the annular body of a constant velocity joint and having a small end terminating in a small diameter axial clamping extension adapted to be secured to a shaft extending from said joint, and in which said joint body is formed with an outwardly opening annular recess, the improvement comprising:

a plurality of annular convolutions each defined by a boot wall having axially spaced radially inner ends extending to a common radially outer peak, including a first convolution positioned axially adjacent to said boot large end, said first convolution having means thereon forming an annular retention convolution portion adapted to be received on an outwardly opening recess in said joint body, said retention portion being connected to said large diameter clamping extension, a second convolution adjacent to said boot small end having one end thereof connected to said small diameter clamping extension, and an integral non-convoluted rolling diaphragm portion in said boot wall intermediate said first and second convolutions, said rolling diaphrgm portion including a first outwardly-curved section joining with said first convolution at the inner end thereof remote from said large end, said rolling diaphragm portion further having a second section extending radially inwardly and axially from said first section toward said larger end in the released state and turning toward said smaller boot end, said rolling diaphragm portion further having a third generally axially extending section joining said second section and extending to a radially inner end of said second convolution, said rolling diaphragm portion providing for angular deflection of said boot ends without inducing excessive tensile strain on the boot wall.

* * * * *